United States Patent
Horn et al.

(10) Patent No.: US 11,330,594 B1
(45) Date of Patent: May 10, 2022

(54) OPTIMIZED UE BEAMFORMING WITH NULL SPACE REPORT

(71) Applicant: QUALCOMM Incorporated, San Diego, CA (US)

(72) Inventors: Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/105,383

(22) Filed: Nov. 25, 2020

(51) Int. Cl.
| | | |
|---|---|---|
| H04W 72/04 | (2009.01) | |
| H04W 76/15 | (2018.01) | |
| H04W 36/00 | (2009.01) | |
| H04W 72/08 | (2009.01) | |

(52) U.S. Cl.
CPC ....... *H04W 72/048* (2013.01); *H04W 72/046* (2013.01); *H04W 76/15* (2018.02); *H04W 36/0058* (2018.08); *H04W 36/0069* (2018.08); *H04W 72/082* (2013.01)

(58) Field of Classification Search
CPC . H04W 72/048; H04W 76/15; H04W 72/046; H04W 36/006; H04W 36/005; H04W 72/08
See application file for complete search history.

(56) References Cited

U.S. PATENT DOCUMENTS

| | | | | |
|---|---|---|---|---|
| 6,061,023 | A  * | 5/2000 | Daniel | H04B 7/2041 |
| | | | | 342/354 |
| 2001/0020918 | A1 * | 9/2001 | Takai | H01Q 3/2605 |
| | | | | 343/729 |
| 2004/0235529 | A1 * | 11/2004 | Tarokh | H04B 7/0617 |
| | | | | 455/562.1 |
| 2008/0007454 | A1 * | 1/2008 | Minkoff | H04L 25/03006 |
| | | | | 342/379 |
| 2008/0267133 | A1 * | 10/2008 | Shida | H04B 7/0874 |
| | | | | 370/334 |
| 2010/0080323 | A1 * | 4/2010 | Mueck | H04L 5/0016 |
| | | | | 375/296 |
| 2011/0032149 | A1 * | 2/2011 | Leabman | H01Q 3/2605 |
| | | | | 342/368 |
| 2011/0310827 | A1 * | 12/2011 | Srinivasa | H04L 25/0242 |
| | | | | 370/329 |
| 2013/0241768 | A1 * | 9/2013 | Petersen | G01S 19/43 |
| | | | | 342/357.27 |
| 2021/0345406 | A1 * | 11/2021 | Myung | H04W 24/08 |

* cited by examiner

*Primary Examiner* — Kashif Siddiqui
(74) *Attorney, Agent, or Firm* — Procopio, Cory, Hargreaves & Savitch LLP; Nerrie M. Zohn

(57) ABSTRACT

A configuration for optimized UE beamforming with a null space report. The apparatus establishes a connection with a base station. The apparatus transmits, to the base station, a UE report comprising one or more beamforming capabilities of the UE. The apparatus receives, from the base station, a null space report comprising null space information for the UE based on the beamforming capabilities reported by the UE.

30 Claims, 9 Drawing Sheets

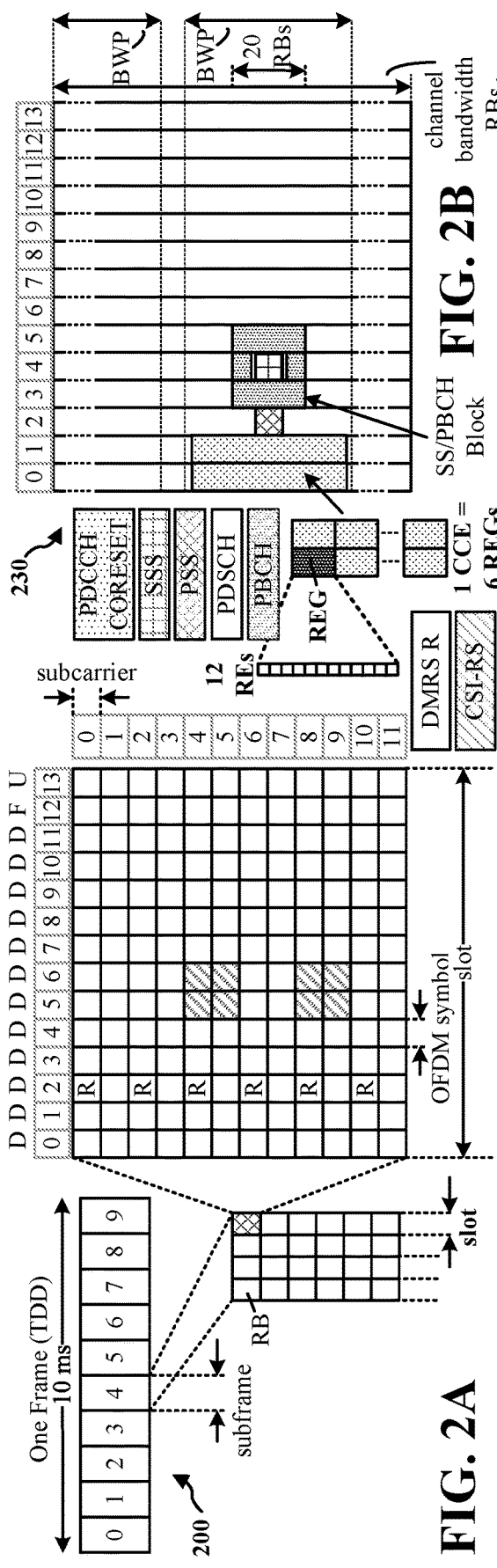
FIG. 2A
FIG. 2B
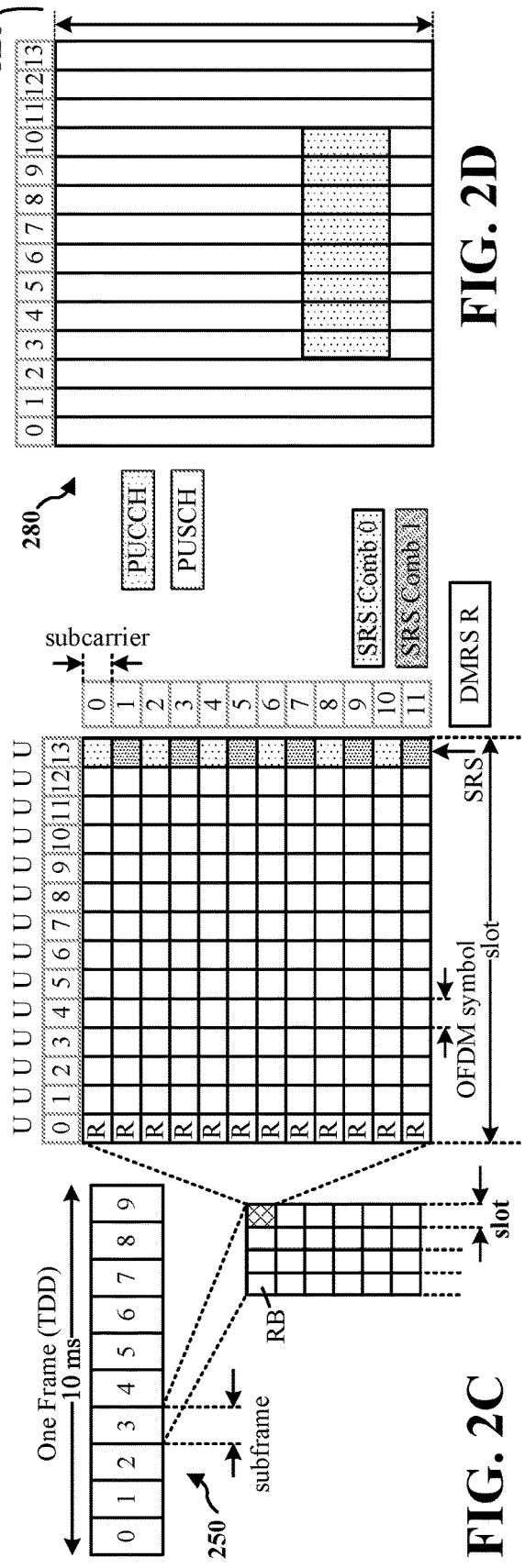
FIG. 2C
FIG. 2D

OPTIMIZED UE BEAMFORMING WITH NULL SPACE REPORT

BACKGROUND

Technical Field

The present disclosure relates generally to communication systems, and more particularly, to a configuration for optimized user equipment (UE) beamforming with a null space report.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus establishes a connection with a base station. The apparatus transmits, to the base station, a UE report comprising one or more beamforming capabilities of the UE. The apparatus receives, from the base station, a null space report comprising null space information for the UE based on the beamforming capabilities reported by the UE.

In an aspect of the disclosure, a method, a computer-readable medium, and an apparatus are provided. The apparatus may be a device at a base station. The device may be a processor and/or a modem at a base station or the base station itself. The apparatus receives, from a UE, a request to establish a connection. The apparatus receives, from the UE, a UE report comprising one or more beamforming capabilities of the UE. The apparatus transmits, to the UE, a null space report comprising null space information for the UE based on the beamforming capabilities reported by the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
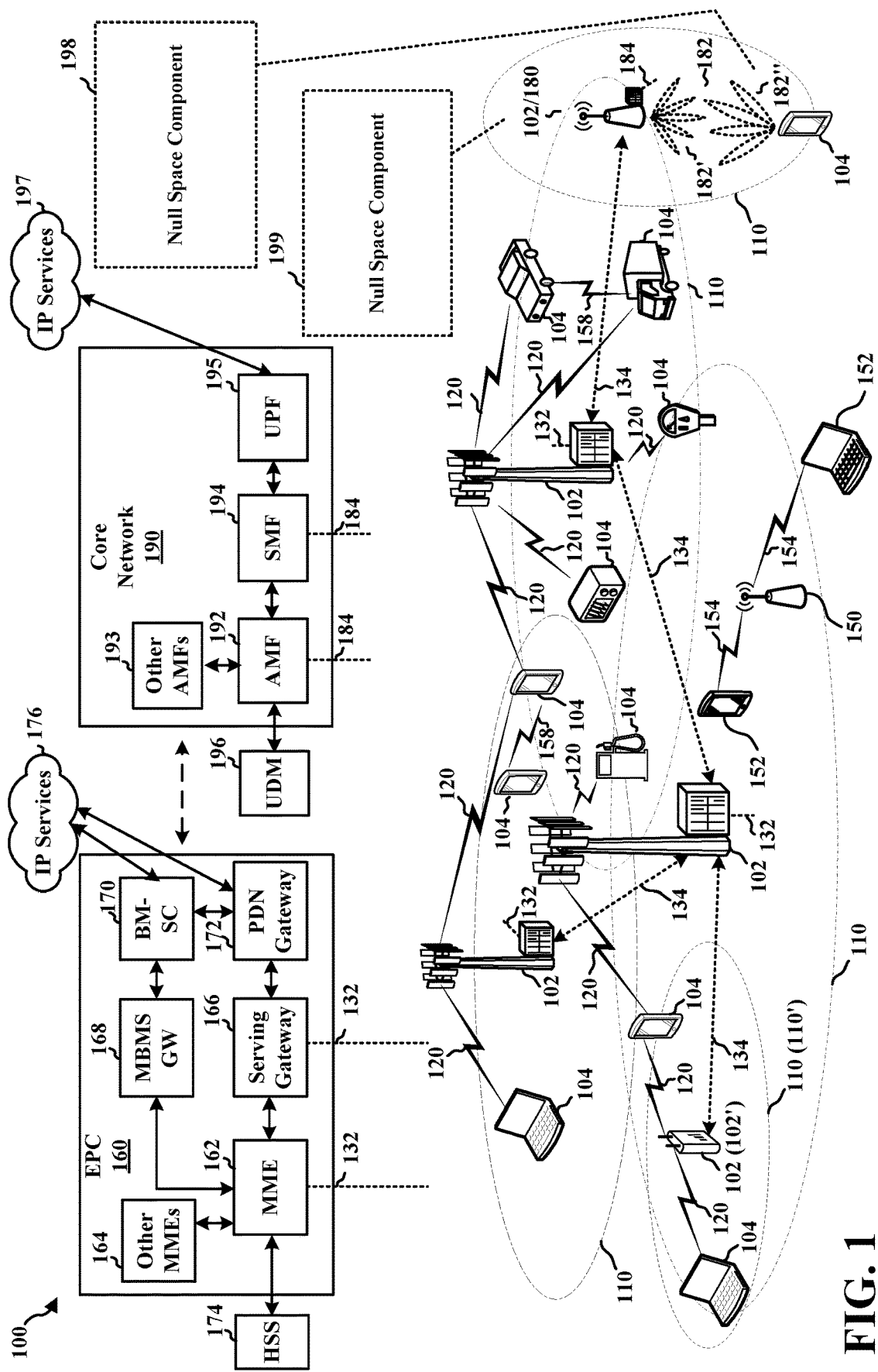
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to optimize the UE beamforming based on a null space report provided by a base station 180. For example, the UE 104 of FIG. 1 may include a null space component 198 configured to optimize the UE beamforming based on a null space report provided by the base station 180. The UE 104 may establish a connection with the base station 180. The UE 104 may transmit, to the base station 180, a UE report comprising one or more beamforming capabilities of the UE. The UE 104 may receive, from the base station 180, a null space report comprising null space information for the UE 104 based on the beamforming capabilities reported by the UE.

Referring again to FIG. 1, in certain aspects, the base station 180 may be configured to provide the UE 104 with a null space report to optimize UE beamforming. For example, base station 180 of FIG. 1 may include a null space component 199 configured to provide the UE 104 with a null space report to optimize UE beamforming. The base station 180 may receive, for the UE 104, a request to establish a connection. The base station 180 may receive, from the UE 104, a UE report comprising one or more beamforming capabilities of the UE 104. The base station 180 may transmit, to the UE 104, a null space report comprising null space information for the UE 104 based on the beamforming capabilities reported by the UE 104.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
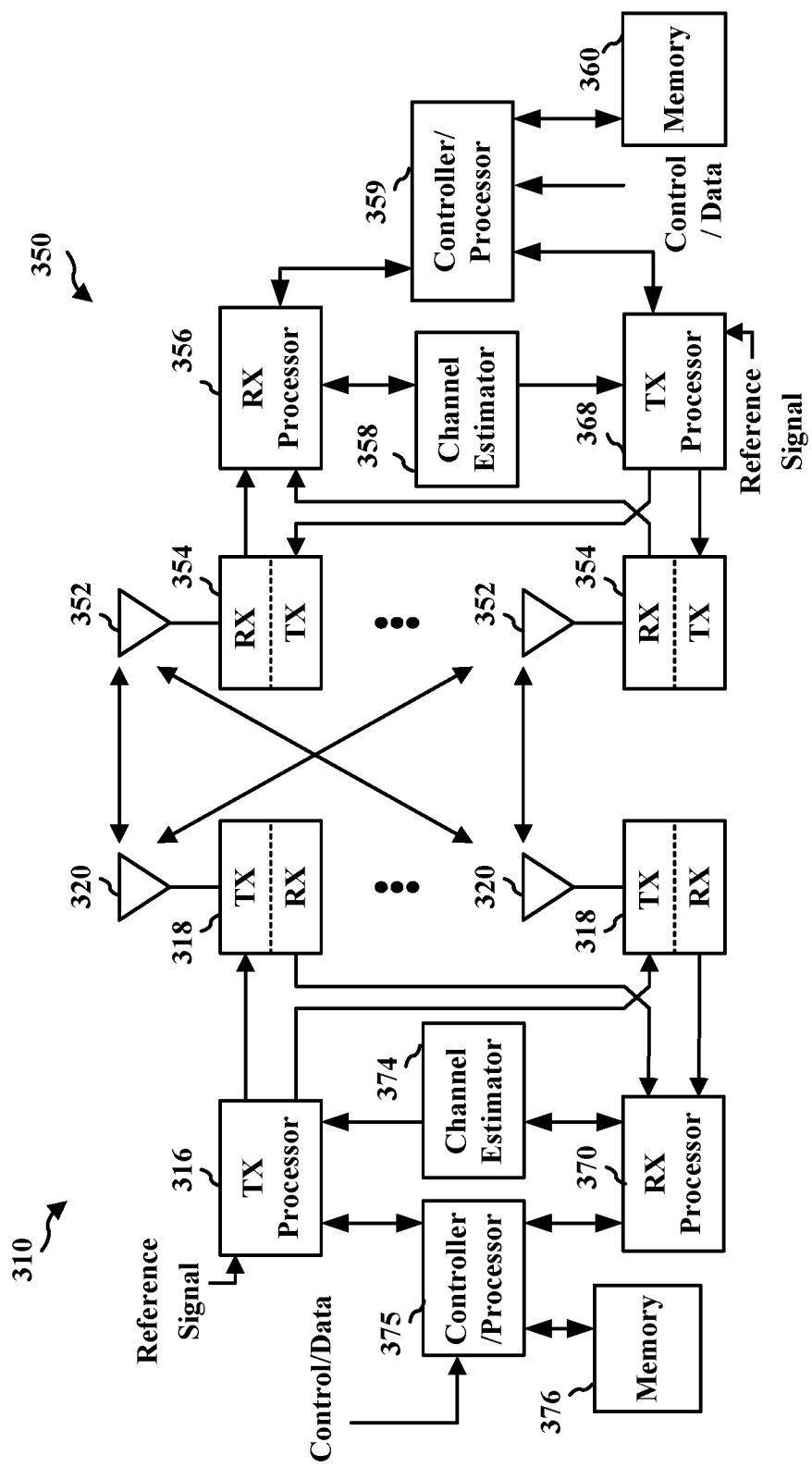
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integ-rity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In wireless communication systems (e.g., including 5G NR wireless communication systems and other wireless communication systems), reducing the power consumption of the UE may be challenging. This challenge may become more prominent with the growth in bandwidths, such as expanding to bandwidths including frequency range (FR) 4, FR5, 6G, etc. Supporting higher bandwidth signals and increased data rates may result in an increase of power consumption at the UE.

As wireless communication systems progress to higher frequency bands, such as but not limited to sub-THz, the antenna dimensions may decrease due to the antenna size being relative to the wavelength. With the decreased size of individual antennas, a UE may include an increased number of antennas in the same size antenna array. An increase of the number of antenna elements may result in an improved spectral efficiency due to an increased array gain and a reduction of interference. For example, the increased number of antenna elements may enable the UE to transmit and receiving using a narrower beam width that may result in an increased spatial separation between beams.

Figure 4A:
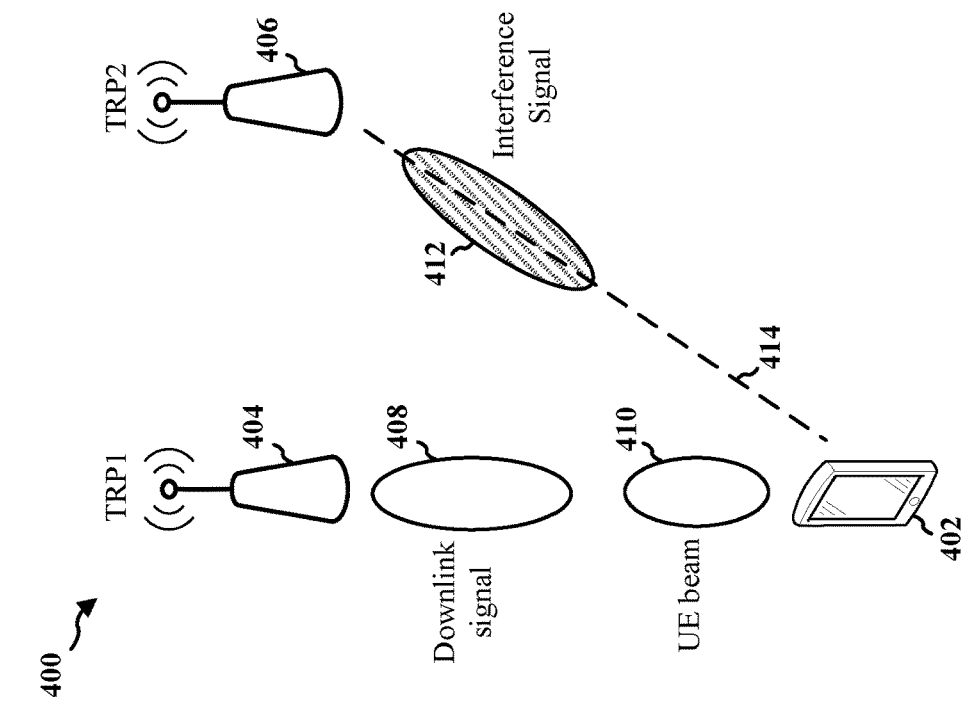
FIG. 4A is a diagram illustrating an example of a signal received from a null space angle in a wireless communication system.
Figure 4B:
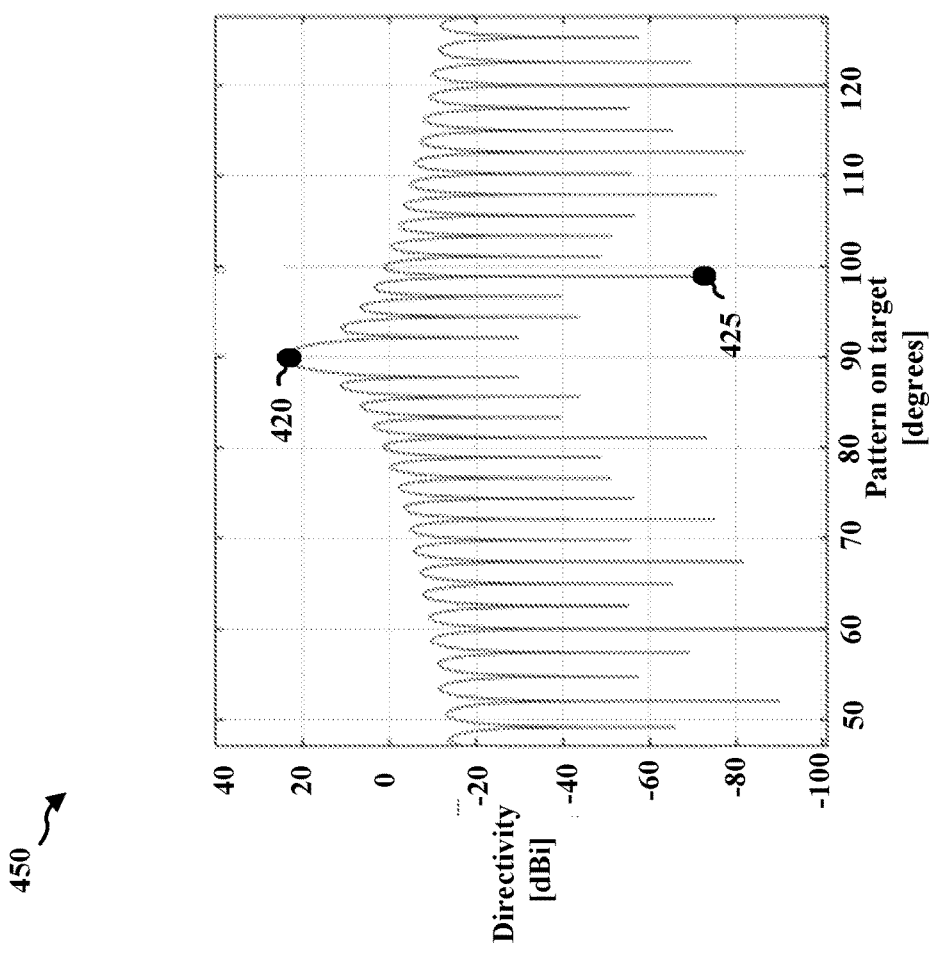
FIG. 4B is a graph illustrating an example of a UE pattern including null spaces.

An effect of the increased number of antennas is the increase in the null space rank, e.g., the number of null spaces, which linearly increase with the increase in the number of antennas. The null space may be viewed intuitively as the angle of arrival that may be nulled due to UE beamforming. For example, a signal transmitted from a null angle of arrival will be faded. For example, with reference to the diagram 400 of FIG. 4A, the diagram 400 includes a UE 402, a first transmission reception point (TRP) TRP1 404 and a second TRP TRP2 406. TRP1 404 may transmit a downlink signal 408 to the UE 402, while the UE 402 utilizes a UE receive beam 410 to receive the downlink signal 408 from the TRP1 404. TRP2 406 may transmit a downlink signal 412 in a direction 414 towards the UE 402. The downlink signal 412 from the TRP2 406 may be intended for another UE (not shown), but may be transmitted along the direction 414 which corresponds to a null space of the UE 402, such that the downlink signal 412 does not cause interference with the UE 402. The angle of arrival of the downlink signal 412 along the direction 414 may be nulled due to the beamforming at the UE 402, such that the downlink signal 412 will be faded along the direction 414. FIG. 4B illustrates a graph 450 showing an example UE pattern showing null spaces at different angles of arrival for the UE. Point 420 illustrates a direction, or space, in which the UE receives a signal. Point 425 illustrates an example null space, e.g., a space between directional beams, where the UE does not receive a signal or received a reduced amount of the signal compared to point 420. The UE may have one or more null spaces, where the directions associated with the one or more null spaces may represent a vector of weights that spans the null space. The spatial direction corresponding to point 425, and the other angles having reduced reception, may be referred to as a null space for the UE. TRP2 406 may transmit a signal to a different UE that would arrive at the UE in the null space at point 425 as a way of reducing the interference caused to the UE by the signal. The reduction of the interference may also be referred to as de-boosting interference. The number of null spaces at the UE may be based on the number of antennas at the UE. An increase in the number of antennas may correspond to an increase in a null space rank. The rank of a null space may be based on the number of antennas and the number of layers after beamforming. For example, the rank of the null space may be determined by the number of antennas minus the number of layers after the beamforming.

In some instances, a space frequency multi TRP (SFMT) approach may use a high rank of the null space to transmit, to the UE, a peak to average power ratio (PAPR) reduction signal in a null space of the UE, which may reduce the UE's power consumption. The UE null space may be utilized to optimize the beam management of the multi-UE communication environment. For example, a base station may use one or more null spaces of the UE to transmit signals to other UEs that may cause interference to the UE. For example, the null space may be used to optimize the UE's performance by directing the UE beamforming nulls to be in the interferers arrival directions.

Aspects presented herein provide a configuration for the base station to provide a null space report to a UE to allow the UE to improve or optimize its beamforming based on the null space report. The null space report may be generated by a base station and include null space information for the UE based on beamforming capabilities of the UE. In some aspects, the null space report may assist the UE in optimizing the UE performance and/or reduce UE power consumption. In some aspects, the base station may be aware of future interference from other base stations, TRPs, antenna panels, as well as their corresponding angle of arrival, such that the null space report may include such information and may provide instructions to the UE to mitigate such future interferers. In some aspects, the null space report may assist in reducing UE PAPR utilizing SFMT. At least one advantage of the disclosure is that the null space report may assist in the UE reducing or cancelling interference which may increase performance of the UE. Another advantage of the disclosure is that reducing the PAPR of the UE using SFMT may result in a reduced power consumption at the UE.

In some instances, during a connection establishment procedure, the UE may report, to the base station, parameters corresponding to beamforming capabilities of the UE. For example, the UE may provide an active number of antennas and a corresponding spread in the antenna array structure. The antenna array structure may be reported and may be defined by type of array, such as but not limited to, linear array, rectangular array, circular array, or the like. The UE may provide the distance between adjacent antennas and/or the antenna main beamwidth (e.g., average antenna beamwidth, a maximum antenna beamwidth, or a minimum antenna beamwidth). The UE may provide information related to the phase shifters capability with a supported number of bits per angle and amplitude. The UE may provide a vector of phase shifting supported values, which may be reported per antenna phase shifter or for one phase shifter and assuming a similar design is utilized for all the antennas. The UE may report the estimated downlink signal angle of arrival, which may be estimated on a channel state information reference signal (CSI-RS) or on a demodulation reference signal (DMRS). In some instances, the estimated angle of arrival may be reported in a periodic manner, for example, in a CSI report or may be triggered by an RRC message to update the base station.

In some instances, the base station may provide the UE with a null space report. The null space report may include an angle of each requested UE null space. The number of null spaces provided may be limited to a predetermined maximum null space integer configured in an RRC message during the connection establishment procedure. In some instances, each null space reported may include information as to which axis or axes the null space corresponds to in a coordinate system (e.g., Cartesian coordinates, polar coordinates, or any other possible coordinate system).

In some instances, the base station may report the desired weights for each antenna phase shifter to identify the requested null spaces of the UE. Providing the weights used for each antenna phase shifter may provide the base station with the full beamforming configuration of the UE. The UE may be configured to apply the reported weights on the phase shifters or may maintain the desired null space locations.

In some instances, the null space report may be applied after each beam management refinement procedure. In some instances, the null space report may be triggered by the base station in response to a change in the calculated phase shifter weights. The change of the calculated phase shifter weights may occur due to expected future interferes, which may comprise interferes from the same base station or from different panels, TRPs, or from different base stations. The change of the calculated phase shifter weights may occur due to channel changes, a change in the UE location with respect to the base station (e.g., TRPs). Once the UE changes its location, the TRPs will be located at different angles. The change of the calculated phase shifter weights may occur due to a UE request. For example, the UE may estimate a desired beamforming to determine if the base station report needs to be updated. The change of the calculated phase shifter weights may occur due to the UE performing a handover to a different base station, or may be reported in MAC-CE or a triggered RRC message.

In some instances, the base station may be configured to define the null spaces and/or weights. For example, the null report transmitted to the UE may optimize the UE interference mitigation based on the base station having knowledge of the surrounding expected interferers and their direction, such that each interferer directed to the UE will be in the null space of the UE, which may result in an improved UE performance. In some instances, the null report may include an interferer AOA report indicating, to the UE, expected directions of the interferers and the nulls of the UE that may reduce or mitigate interference from such interferers. The UE may be configured to position the null space to correspond with the expected directions of the interferers such that the signal from the interferers is directed at the null space of the UE and does not interfere with the UE.

In some instances, the null report may assist to reduce the UE power consumption by reducing the UE PAPR and utilizing SFMT. For example, the base station may report the desired weights for at least one antenna phase shifter of the UE. The null space information in the null space report along with the desired weights may assist in preventing or reducing a PAPR reduction signal from interfering with a downlink signal from the base station, such that interference may be mitigated by the UE beamforming. As such, the PAPR reduction signal may reduce power consumption at the UE.

Figure 5:
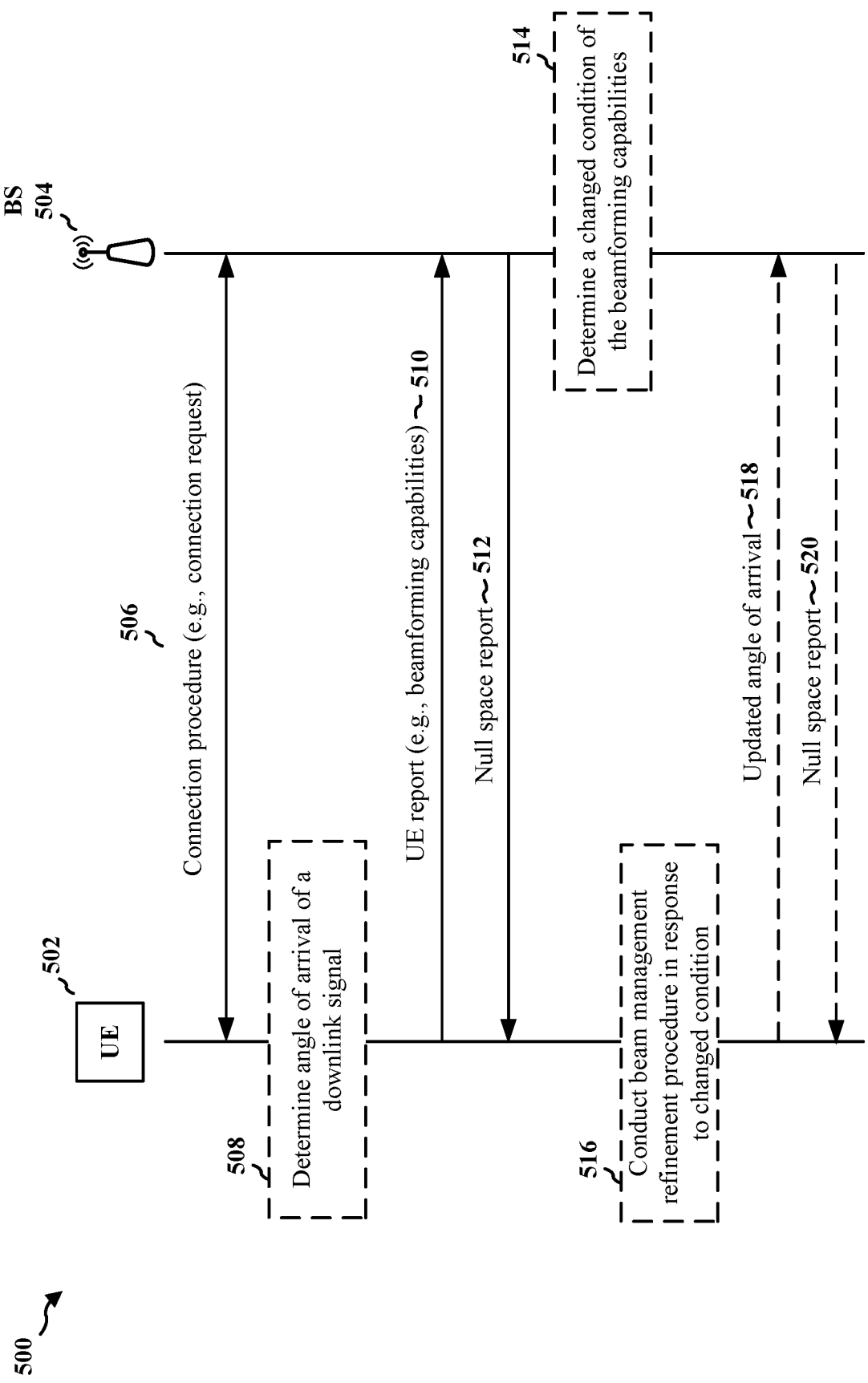
FIG. 5 is a call flow diagram of signaling between a UE and a base station in accordance with certain aspects of the disclosure.

FIG. 5 is a call flow diagram 500 of signaling between a UE 502 and a base station 504. The base station 504 may be configured to provide at least one cell. The UE 502 may be configured to communicate with the base station 504. For example, in the context of FIG. 1, the base station 504 may correspond to base station 102/180 and, accordingly, the cell may include a geographic coverage area 110 in which communication coverage is provided and/or small cell 102' having a coverage area 110'. Further, a UE 502 may correspond to at least UE 104. In another example, in the context of FIG. 3, the base station 504 may correspond to base station 310 and the UE 502 may correspond to UE 350. Optional aspects are illustrated with a dashed line.

As illustrated at 506, the UE 502 may establish a connection with the base station 504. In some aspects, the UE 502 may transmit, to the base station 504, a request to establish the connection.

In some aspects, for example as illustrated at 508, the UE 502 may determine an angle of arrival for a downlink signal. The UE 502 may determine the angle of arrival for the downlink signal based on a channel state information reference signal (CSI-RS) or a demodulation reference signal (DMRS). The UE 502 may receive the CSI-RS or the DMRS during a connection establishment procedure with the base station 504.

As illustrated at 510, the UE 502 may transmit a UE report comprising one or more beamforming capabilities of the UE 502. The UE 502 may transmit the UE report comprising the one or more beamforming capabilities of the UE 502 to the base station 504. The base station 504 may receive the UE report from the UE 502. In some aspects, the beamforming capabilities of the UE 502 may comprise an active number of antennas at the UE 502. In some aspects, the beamforming capabilities of the UE 502 may comprise an antenna array structure. The antenna array structure may comprise at least one of a linear array, a rectangular array, a circular array, or the like. The disclosure is not intended to be limited the example arrays disclosed herein, such that many different array configurations may be used. In some aspects, the beamforming capabilities of the UE 502 may comprise a distance between adjacent antennas. In some aspects, the beamforming capabilities of the UE 502 may comprise at least one of an average antenna main beamwidth, a maximum antenna beamwidth, or a minimum antenna beamwidth. In some aspects, the beamforming capabilities of the UE 502 may comprise phase shifter capabilities. The phase shifter capabilities may include a number of supported bits per angle and amplitude or a vector of phase shifting supported values. In some aspects, the beamforming capabilities of the UE 502 may comprise an angle of arrival of a downlink signal from the base station 504.

As illustrated at 512, the base station 504 may transmit a null space report comprising null space information for the UE 502. The base station 504 may transmit the null space report to the UE 502. The UE 502 may receive the null space report from the base station 504. The null space report may comprise the null space information for the UE 502 based on the beamforming capabilities reported by the UE 502.

In some aspects, for example as illustrated at 514, the base station 504 may determine a changed condition of the beamforming capabilities of the UE 502. The null space report may comprise parameters for a set of requested null spaces for the UE 502, as determined by the base station 504. In some aspects, the parameters for each requested null space in the set of requested null spaces for the UE 502 may comprise an angle for a corresponding null space. In some aspects, the parameters for each requested null space in the set of requested null spaces for the UE 502 may comprise one or more null space weights for at least one antenna phase shifter of the UE 502. In some aspects, the null space report may comprise an interferer angle of arrival report indicating a location of one or more interferers and a corresponding null space of the UE 502 to mitigate interference from the one or more interferers. In such instances, the UE 502 may mitigate interference from the one or more interferers by positioning one or more of the requested null spaces towards the direction or location of the one or more interferers, such that any signals from the one or more interferers is directed towards the one or more requested null spaces of the UE 502.

In some aspects, for example as illustrated at 516, the UE 502 may conduct a beam management refinement procedure. The UE 502 may conduct the beam management refinement procedure in response to a changed condition of the UE 502. The changed condition of the UE 502 may comprise, for example, a change in the phase shifter weights used by the UE 502, a change in the beamforming at the UE 502, a change in a channel, a change of a location of the UE 502 in comparison to the base station 504, or a handover to a different base station. The null space report may be triggered by the beam management refinement procedure.

In some aspects, for example as illustrated at 518, the UE 502 may transmit an updated angle of arrival of the downlink signal. The UE 502 may transmit the updated angle of arrival of the downlink signal to the base station 504. The base station 504 may receive the updated angle of arrival of the downlink signal from the UE 502. The UE 502 may transmit the updated angle of arrival of the downlink signal based on a changed condition of the UE 502. In some aspect, the UE 502 may transmit a UE report having the updated angle of arrival of the downlink signal.

Figure 6:
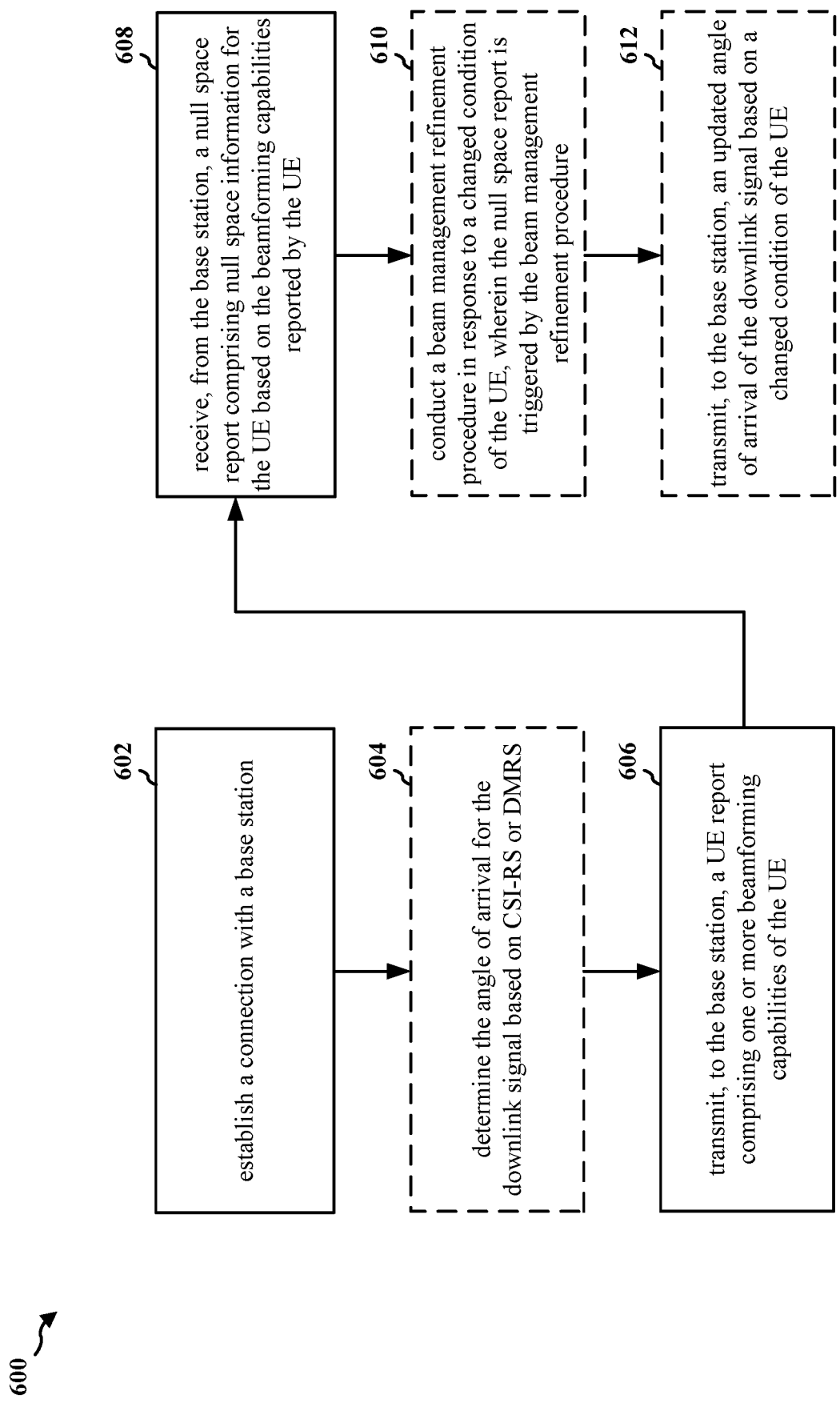
FIG. 6 is a flowchart of a method of wireless communication.

FIG. 6 is a flowchart 600 of a method of wireless communication. The method may be performed by a UE or a component of a UE (e.g., the UE 104, 402, 502; the apparatus 702; the cellular baseband processor 704, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. Optional aspects are illustrated with a dashed line. The method may allow a UE to optimize its beamforming based on a null space report provided by a base station.

At 602, the UE may establish a connection with a base station. For example, 602 may be performed by connection component 740 of apparatus 702. In some aspects, the UE may transmit, to a base station, a request to establish a connection. For example, the UE may perform a random access procedure, or send a random access message, in order to establish a connection with the base station.

In some aspects, for example at 604, the UE may determine an angle of arrival for a downlink signal. For example, 604 may be performed by AOA component 742 of apparatus 702. The UE may determine the angle of arrival for the downlink signal based on CSI-RS or DMRS received from the base station. The UE may receive the CSI-RS or the DMRS during a connection establishment procedure with the base station.

At 606, the UE may transmit a UE report comprising one or more beamforming capabilities of the UE. For example, 606 may be performed by UE report component 744 of apparatus 702. The UE may transmit the UE report comprising the one or more beamforming capabilities of the UE to the base station. FIG. 5 illustrates an example of the UE 502 transmitting beamforming capabilities 510 to the base station 504. The beamforming capabilities may provide information that relates to one or more null spaces of the UE, e.g., as described in connection with FIGS. 4A and 4B. In some aspects, the beamforming capabilities of the UE may comprise an active number of antennas at the UE. In some aspects, the beamforming capabilities of the UE may comprise an antenna array structure. The antenna array structure may comprise at least one of a linear array, a rectangular array, a circular array, or the like. In some aspects, the beamforming capabilities of the UE may comprise a distance between adjacent antennas. In some aspects, the beamforming capabilities of the UE may comprise at least one of an average antenna main beamwidth, a maximum antenna beamwidth, or a minimum antenna beamwidth. In some aspects, the beamforming capabilities of the UE may comprise phase shifter capabilities. The phase shifter capabilities may include a number of supported bits per angle and amplitude or a vector of phase shifting supported values. In some aspects, the beamforming capabilities of the UE may comprise an angle of arrival of a downlink signal from the base station.

At 608, the UE may receive a null space report comprising null space information for the UE. For example, 608 may be performed by null space component 746 of apparatus 702. FIG. 5 illustrates an example of the UE 502 receiving a null space report 512 from the base station 504. The UE may receive the null space report from the base station. The null space report may comprise the null space information for the UE based on the beamforming capabilities reported by the UE. In some aspects, the null space report may comprise parameters for a set of a requested null spaces for the UE. The parameters for each requested null space in the set of requested null spaces for the UE may comprise an angle for a corresponding null space. The parameters for each requested null space in the set of requested null spaces for the UE may comprise one or more null space weights for at least one antenna phase shifter of the UE. In some aspects, the null space report may be triggered based on a change of phase shifter weights for the UE. The change of the phase shifter weights for the UE may occur due to one or more of an expected future interference from the base station or another base station, a change in a channel, a change of a location of the UE in comparison to the base station, or a handover to a different base station. In some aspects, the null space report may comprise an interferer angle of arrival report indicating a location of one or more interferers and a corresponding null space of the UE to mitigate interference from the one or more interferers. In such instances, the UE may mitigate interference from the one or more interferers by positioning one or more null spaces towards the direction or location of the one or more interferers, such that any signals from the one or more interferers is directed towards the one or more null spaces of the UE.

In some aspects, for example at 610, the UE may conduct a beam management refinement procedure. For example, 610 may be performed by beam management component 748 of apparatus 702. The UE may conduct the beam management refinement procedure in response to a changed condition of the UE. The changed condition of the UE may comprise, for example, a change in the phase shifter weights used by the UE, a change in the beamforming at the UE, a change in a channel, a change of a location of the UE in comparison to the base station, or a handover to a different base station. The null space report may be triggered by the beam management refinement procedure. FIG. 5 illustrates an example in which the null space report 520 may be triggered by a beam management refinement procedure.

In some aspects, for example at 612, the UE may transmit an updated angle of arrival of the downlink signal. For example, 612 may be performed by AOA component 742. The UE may transmit the updated angle of arrival of the downlink signal to the base station. The UE may transmit the updated angle of arrival of the downlink signal based on a changed condition of the UE. In some aspect, the UE may transmit a UE report having the updated angle of arrival of the downlink signal. FIG. 5 illustrates an example in which the updated angle of arrival 518 is transmitted from the UE to the base station.

Figure 7:
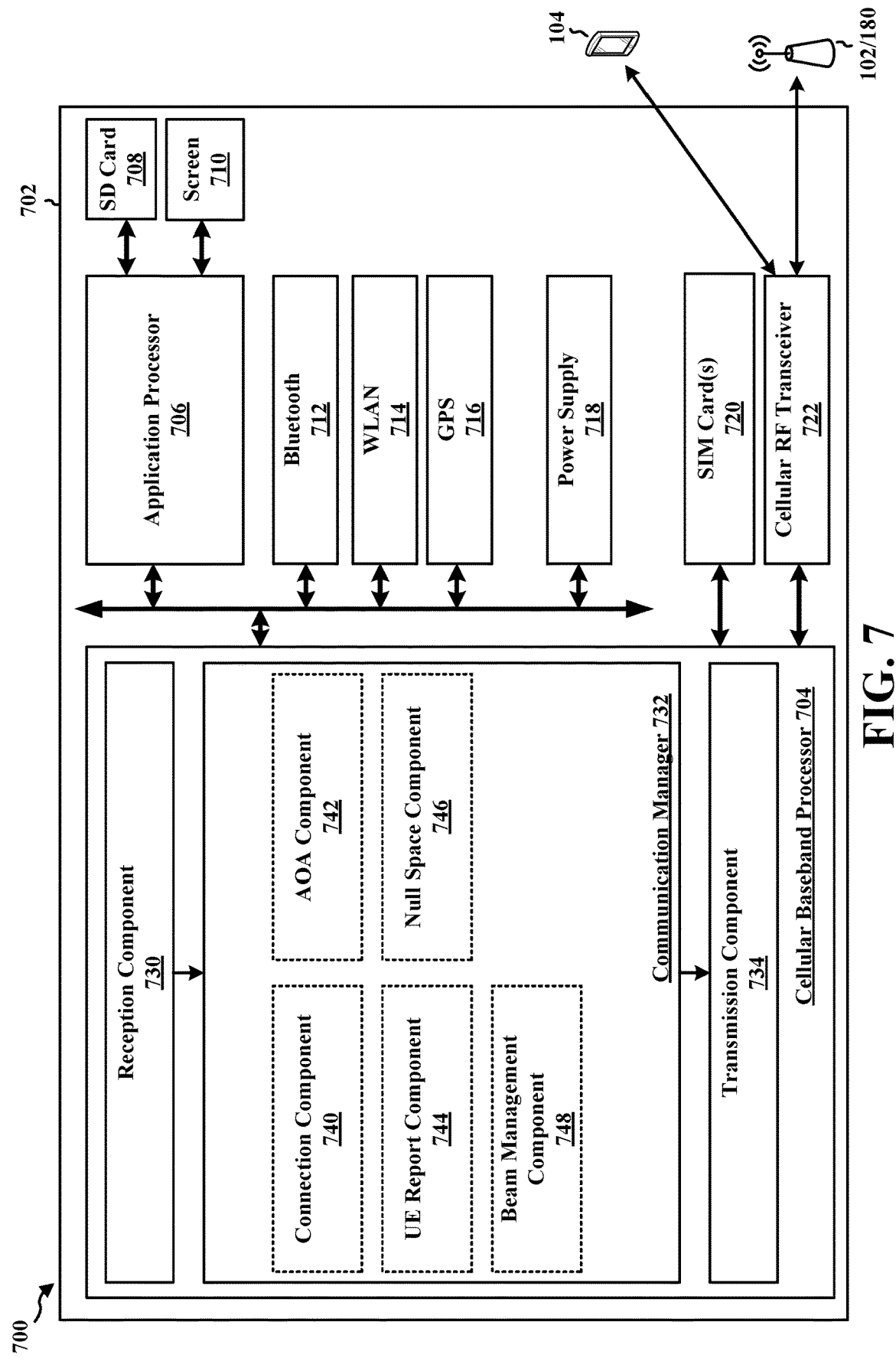
FIG. 7 is a diagram illustrating an example of a hardware implementation for an example apparatus.

FIG. 7 is a diagram 700 illustrating an example of a hardware implementation for an apparatus 702. The apparatus 702 is a UE and includes a cellular baseband processor 704 (also referred to as a modem) coupled to a cellular RF transceiver 722 and one or more subscriber identity modules (SIM) cards 720, an application processor 706 coupled to a secure digital (SD) card 708 and a screen 710, a Bluetooth module 712, a wireless local area network (WLAN) module 714, a Global Positioning System (GPS) module 716, and a power supply 718. The cellular baseband processor 704 communicates through the cellular RF transceiver 722 with the UE 104 and/or BS 102/180. The cellular baseband processor 704 may include a computer-readable medium/ memory. The computer-readable medium/memory may be non-transitory. The cellular baseband processor 704 is responsible for general processing, including the execution of software stored on the computer-readable medium/ memory. The software, when executed by the cellular baseband processor 704, causes the cellular baseband processor 704 to perform the various functions described supra. The computer-readable medium/memory may also be used for storing data that is manipulated by the cellular baseband processor 704 when executing software. The cellular baseband processor 704 further includes a reception component 730, a communication manager 732, and a transmission component 734. The communication manager 732 includes the one or more illustrated components. The components within the communication manager 732 may be stored in the computer-readable medium/memory and/or configured as hardware within the cellular baseband processor 704. The cellular baseband processor 704 may be a component of the UE 350 and may include the memory 360 and/or at least one of the TX processor 368, the RX processor 356, and the controller/processor 359. In one configuration, the apparatus 702 may be a modem chip and include just the cellular baseband processor 704, and in another configuration, the apparatus 702 may be the entire UE (e.g., see 350 of FIG. 3) and include the aforediscussed additional modules of the apparatus 702.

The communication manager 732 includes a connection component 740 that is configured to establish a connection with a base station, e.g., as described in connection with 602 of FIG. 6. The communication manager 732 further includes an AOA component 742 that is configured to determine an angle of arrival for a downlink signal, e.g., as described in connection with 604 of FIG. 6. The AOA component 742 may be configured to may transmit an updated angle of arrival of the downlink signal, e.g., as described in connection with 612 of FIG. 6. The communication manager 732 further includes a UE report component 744 that is configured to transmit a UE report comprising one or more beamforming capabilities of the UE, e.g., as described in connection with 606 of FIG. 6. The communication manager 732 further includes a null space component 746 that is configured to receive a null space report comprising null space information for the UE, e.g., as described in connection with 608 of FIG. 6. The communication manager 732 further includes a beam management component 748 that is configured to conduct a beam management refinement procedure, e.g., as described in connection with 610 of FIG. 6.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 702, and in particular the cellular baseband processor 704, includes means for establishing a connection with a base station. The apparatus includes means for transmitting, to the base station, a UE report comprising one or more beamforming capabilities of the UE. The apparatus includes means for receiving, from the base station, a null space report comprising null space information for the UE based on the beamforming capabilities reported by the UE. The apparatus further includes means for determining the angle of arrival for the downlink signal based on CSI-RS or DMRS. The apparatus further includes means for transmitting, to the base station, an updated angle of arrival of the downlink signal based on a changed condition of the UE. The apparatus further includes means for conducting a beam management refinement procedure in response to a changed condition of the UE. The null space report is triggered by the beam management refinement procedure. The aforementioned means may be one or more of the aforementioned components of the apparatus 702 configured to perform the functions recited by the aforementioned means. As described supra, the apparatus 702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 8:
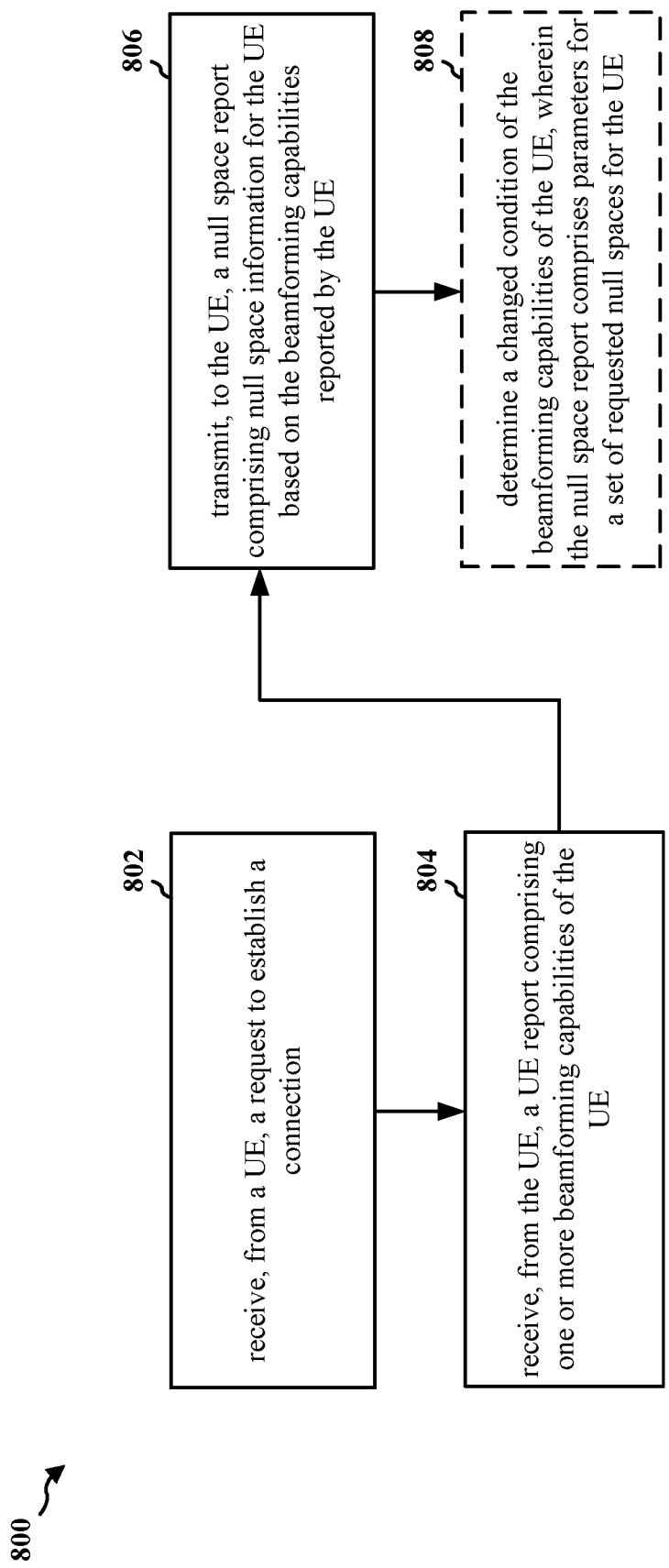
FIG. 8 is a flowchart of a method of wireless communication.

FIG. 8 is a flowchart 800 of a method of wireless communication. The method may be performed by a base station or a component of a base station (e.g., the base station 102/180, 404, 406, 504; the apparatus 902; the baseband unit 904, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. Optional aspects are illustrated with a dashed line. The method may allow a base station to provide a UE with a null space report to optimize UE beamforming.

At 802, the base station may receive a request to establish a connection. For example, 802 may be performed by connection component 940 of apparatus 902. The base station may receive the request to establish the connection from the UE. For example, the UE may perform a random access procedure, or send a random access message, in order to establish a connection with the base station.

At 804, the base station may receive a UE report comprising one or more beamforming capabilities of the UE. For example, 804 may be performed by UE report component 942 of apparatus 902. The base station may receive the UE report from the UE. FIG. 5 illustrates an example of the base station 504 receiving beamforming capabilities 510 from the UE 502. The beamforming capabilities may provide information that relates to one or more null spaces of the UE, e.g., as described in connection with FIGS. 4A and 4B. In some aspects, the beamforming capabilities of the UE may comprise an active number of antennas at the UE. In some aspects, the beamforming capabilities of the UE may comprise an antenna array structure. The antenna array structure may comprise at least one of a linear array, a rectangular array, a circular array, or the like. In some aspects, the beamforming capabilities of the UE may comprise a distance between adjacent antennas. In some aspects, the beamforming capabilities of the UE may comprise at least one of an average antenna main beamwidth, a maximum antenna beamwidth, or a minimum antenna beamwidth. In some aspects, the beamforming capabilities of the UE may comprise phase shifter capabilities. The phase shifter capabilities may include a number of supported bits per angle and amplitude or a vector of phase shifting supported values. In some aspects, the beamforming capabilities of the UE may comprise an angle of arrival of a downlink signal from the base station. The angle of arrival for the downlink signal may be determined based on CSI-RS or DMRS. The base station may transmit the CSI-RS or the DMRS during a connection establishment procedure with the UE.

At 806, the base station may transmit a null space report comprising null space information for the UE. For example, 806 may be performed by null space component 944 of apparatus 902. FIG. 5 illustrates an example of the base station 504 transmitting a null space report 512 to the UE 502. The base station may transmit the null space report to the UE. The null space report may comprise the null space information for the UE based on the beamforming capabilities reported by the UE.

In some aspects, for example at 808, the base station may determine a changed condition of the beamforming capabilities of the UE. For example, 808 may be performed by determination component 946 of apparatus 902. FIG. 5 illustrates an example of the base station 504 determining a changed condition of the beamforming capabilities of the UE. The null space report may comprise parameters for a set of requested null spaces for the UE. In some aspects, the parameters for each requested null space in the set of requested null spaces for the UE may comprise an angle for a corresponding null space. In some aspects, the parameters for each requested null space in the set of requested null spaces for the UE may comprise one or more null space weights for at least one antenna phase shifter of the UE. In some aspects, the null space report may comprise an interferer angle of arrival report indicating a location of one or more interferers and a corresponding null space of the UE to mitigate interference from the one or more interferers. In such instances, the UE may mitigate interference from the one or more interferers by positioning one or more of the requested null spaces towards the direction or location of the one or more interferers, such that any signals from the one or more interferers is directed towards the one or more requested null spaces of the UE.

In some aspects, the base station may be configured to reduce the UE power consumption by reducing the UE PAPR and utilizing SFMT. For example, the base station may report the desired weights for at least one antenna phase shifter of the UE. The null space information in the null space report along with the desired weights may assist in preventing or reducing a PAPR reduction signal from interfering with a downlink signal from the base station, such that interference may be mitigated by the UE beamforming. As such, the PAPR reduction signal may reduce power consumption at the UE.

Figure 9:
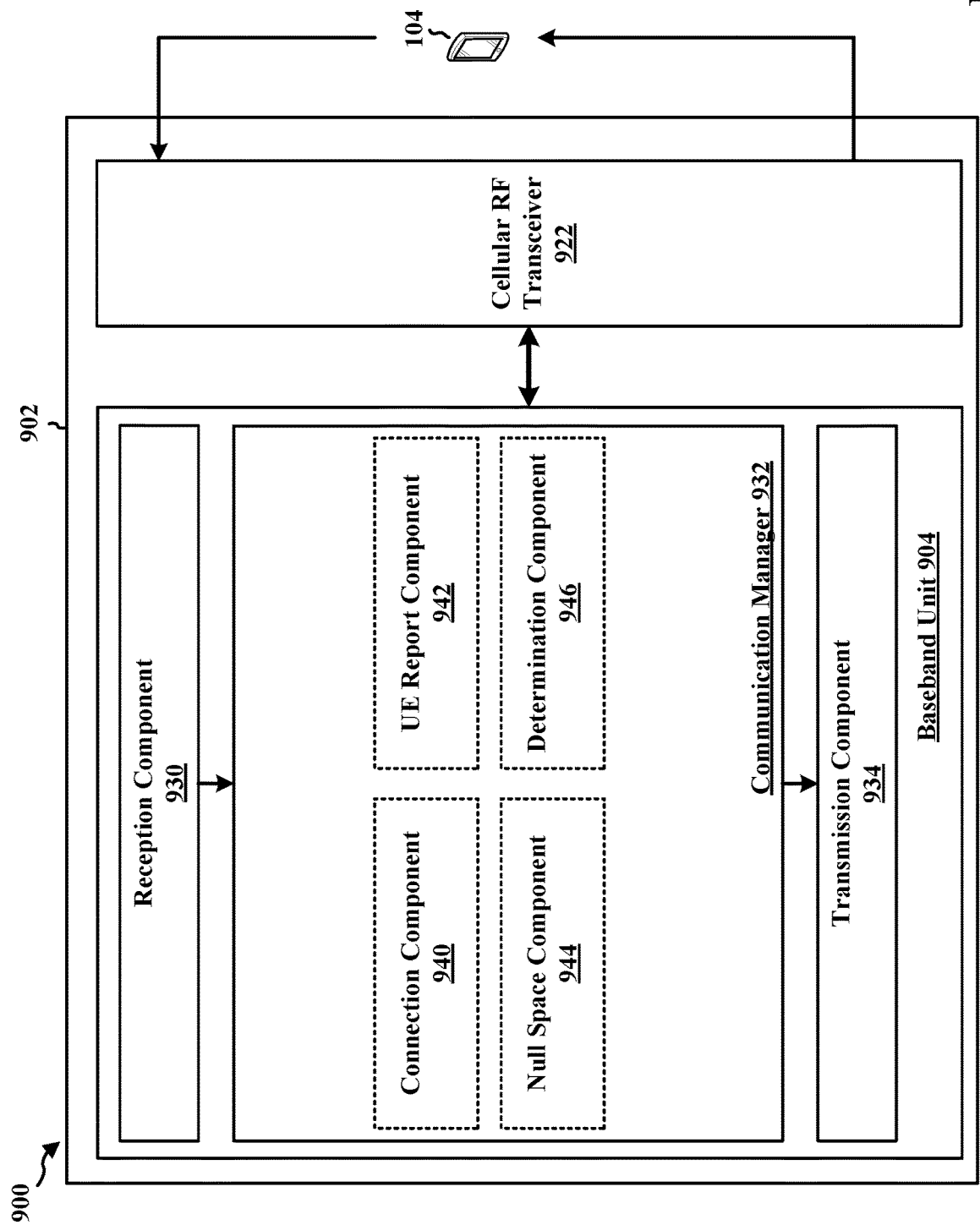
FIG. 9 is a diagram illustrating an example of a hardware implementation for an example apparatus.

FIG. 9 is a diagram 900 illustrating an example of a hardware implementation for an apparatus 902. The apparatus 902 is a BS and includes a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 includes a connection component 940 that may receive a request to establish a connection, e.g., as described in connection with 802 of FIG. 8. The communication manager 932 further includes a UE report component 942 that may receive a UE report comprising one or more beamforming capabilities of the UE, e.g., as described in connection with 804 of FIG. 8. The communication manager 932 further includes a null space component 944 that may transmit a null space report comprising null space information for the UE, e.g., as described in connection with 806 of FIG. 8. The communication manager 932 further includes a determination component 946 that may determine a changed condition of the beamforming capabilities of the UE, e.g., as described in connection with 808 of FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, includes means for receiving, from a UE, a request to establish a connection. The apparatus includes means for receiving, from the UE, a UE report comprising one or more beamforming capabilities of the UE. The apparatus includes means for transmitting, to the UE, a null space report comprising null space information for the UE based on the beamforming capabilities reported by the UE. The apparatus further includes means for determining a changed condition of the beamforming capabilities of the UE, wherein the null space report comprises parameters for a set of requested null spaces for the UE. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The following examples are illustrative only and may be combined with aspects of other embodiments or teachings described herein, without limitation.

Aspect 1 is a method of wireless communication at a UE comprising establishing a connection with a base station; transmitting, to the base station, a UE report comprising one or more beamforming capabilities of the UE; and receiving, from the base station, a null space report comprising null space information for the UE based on the beamforming capabilities reported by the UE.

In Aspect 2, the method of Aspect 1 further includes that the beamforming capabilities of the UE comprise an active number of antennas at the UE.

In Aspect 3, the method of Aspect 1 or 2 further includes that the beamforming capabilities of the UE comprise an antenna array structure, wherein the antenna array structure comprises at least one of a linear array, a rectangular array, or a circular array.

In Aspect 4, the method of any of Aspects 1-3 further includes that the beamforming capabilities of the UE comprise a distance between adjacent antennas.

In Aspect 5, the method of any of Aspects 1-4 further includes that the beamforming capabilities of the UE comprise an average antenna main beamwidth, a maximum antenna beamwidth, or a minimum antenna beamwidth.

In Aspect 6, the method of any of Aspects 1-5 further includes that the beamforming capabilities of the UE comprise phase shifter capabilities, wherein the phase shifter capabilities include a number of supported bits per angle and amplitude or a vector of phase shifting supported values.

In Aspect 7, the method of any of Aspects 1-6 further includes that the beamforming capabilities of the UE comprise an angle of arrival of a downlink signal from the base station.

In Aspect 8, the method of any of Aspects 1-7 further includes determining the angle of arrival for the downlink signal based on CSI-RS or DMRS.

In Aspect 9, the method of any of Aspects 1-8 further includes transmitting, to the base station, an updated angle of arrival of the downlink signal based on a changed condition of the UE.

In Aspect 10, the method of any of Aspects 1-9 further includes that the null space report comprises parameters for a set of a requested null spaces for the UE.

In Aspect 11, the method of any of Aspects 1-10 further includes that the parameters for each requested null space in the set of requested null spaces for the UE comprises an angle for a corresponding null space.

In Aspect 12, the method of any of Aspects 1-11 further includes that the parameters for each requested null space in the set of requested null spaces for the UE comprises one or more null space weights for at least one antenna phase shifter of the UE.

In Aspect 13, the method of any of Aspects 1-12 further includes conducting a beam management refinement procedure in response to a changed condition of the UE, wherein the null space report is triggered by the beam management refinement procedure.

In Aspect 14, the method of any of Aspects 1-13 further includes that the null space report is triggered based on a change of phase shifter weights for the UE.

In Aspect 15, the method of any of Aspects 1-14 further includes that the change of the phase shifter weights for the UE occur due to one or more of an expected future interference from the base station or another base station, a change in a channel, a change of a location of the UE in comparison to the base station, or a handover to a different base station.

In Aspect 16, the method of any of Aspects 1-15 further includes that the null space report comprises an interferer angle of arrival report indicating a location of one or more interferers and a corresponding null space of the UE to mitigate interference from the one or more interferers.

Aspect 17 is a device including one or more processors and one or more memories in electronic communication with the one or more processors storing instructions executable by the one or more processors to cause the system or apparatus to implement a method as in any of Aspects 1-16.

Aspect 18 is a system or apparatus including means for implementing a method or realizing an apparatus as in any of Aspects 1-16.

Aspect 19 is a non-transitory computer readable medium storing instructions executable by one or more processors to cause the one or more processors to implement a method as in any of Aspects 1-16.

Aspect 20 is a method of wireless communication at a base station comprising receiving, from a UE, a request to establish a connection; receiving, from the UE, a UE report comprising one or more beamforming capabilities of the UE; and transmitting, to the UE, a null space report comprising null space information for the UE based on the beamforming capabilities reported by the UE.

In Aspect 21, the method of Aspect 20 further includes that the beamforming capabilities of the UE comprise an active number of antennas at the UE.

In Aspect 22, the method of Aspect 20 or 21 further includes that the beamforming capabilities of the UE comprise an antenna array structure, wherein the antenna array structure comprises at least one of a linear array, a rectangular array, or a circular array.

In Aspect 23, the method of any of Aspects 20-22 further includes that the beamforming capabilities of the UE comprise a distance between adjacent antennas.

In Aspect 24, the method of any of Aspects 20-23 further includes that the beamforming capabilities of the UE comprise an average antenna main beamwidth, a maximum antenna beamwidth, or a minimum antenna beamwidth.

In Aspect 25, the method of any of Aspects 20-24 further includes that the beamforming capabilities of the UE comprise phase shifter capabilities, wherein the phase shifter capabilities include a number of supported bits per angle and amplitude or a vector of phase shifting supported values.

In Aspect 26, the method of any of Aspects 20-25 further includes that the beamforming capabilities of the UE comprise an angle of arrival of a downlink signal from the base station.

In Aspect 27, the method of any of Aspects 20-26 further includes that the angle of arrival for the downlink signal is determined based on CSI-RS or DMRS.

In Aspect 28, the method of any of Aspects 20-27 further includes determining a changed condition of the beamforming capabilities of the UE, wherein the null space report comprises parameters for a set of requested null spaces for the UE.

In Aspect 29, the method of any of Aspects 20-28 further includes that the parameters for each requested null space in the set of requested null spaces for the UE comprises an angle for a corresponding null space.

In Aspect 30, the method of any of Aspects 20-29 further includes that the parameters for each requested null space in the set of requested null spaces for the UE comprises one or more null space weights for at least one antenna phase shifter of the UE.

In Aspect 31, the method of any of Aspects 20-30 further includes that the null space report comprises an interferer angle of arrival report indicating a location of one or more interferers and a corresponding null space of the UE to mitigate interference from the one or more interferers.

Aspect 32 is a device including one or more processors and one or more memories in electronic communication with the one or more processors storing instructions executable by the one or more processors to cause the system or apparatus to implement a method as in any of Aspects 20-31.

Aspect 33 is a system or apparatus including means for implementing a method or realizing an apparatus as in any of Aspects 20-31.

Aspect 34 is a non-transitory computer readable medium storing instructions executable by one or more processors to cause the one or more processors to implement a method as in any of Aspects 20-31.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    establishing a connection with a base station;
    transmitting, to the base station, a UE report comprising one or more beamforming capabilities of the UE; and receiving, from the base station, a null space report comprising null space information for the UE based on beamforming capabilities reported by the UE.

2. The method of claim 1, wherein the beamforming capabilities of the UE comprise an active number of antennas at the UE.

3. The method of claim 1, wherein the beamforming capabilities of the UE comprise an antenna array structure, wherein the antenna array structure comprises at least one of a linear array, a rectangular array, or a circular array.

4. The method of claim 1, wherein the beamforming capabilities of the UE comprise a distance between adjacent antennas.

5. The method of claim 1, wherein the beamforming capabilities of the UE comprise an average antenna main beamwidth, a maximum antenna beamwidth, or a minimum antenna beamwidth.

6. The method of claim 1, wherein the beamforming capabilities of the UE comprise phase shifter capabilities, wherein the phase shifter capabilities include a number of supported bits per angle and amplitude or a vector of phase shifting supported values.

7. The method of claim 1, wherein the beamforming capabilities of the UE comprise an angle of arrival of a downlink signal from the base station.

8. The method of claim 7, further comprising:
determining the angle of arrival for the downlink signal based on a channel state information reference signal (CSI-RS) or a demodulation reference signal (DMRS).

9. The method of claim 7, further comprising:
transmitting, to the base station, an updated angle of arrival of the downlink signal based on a changed condition of the UE.

10. The method of claim 1, wherein the null space report comprises parameters for a set of a requested null spaces for the UE.

11. The method of claim 10, wherein the parameters for each requested null space in the set of the requested null spaces for the UE comprises an angle for a corresponding null space.

12. The method of claim 10, wherein the parameters for each requested null space in the set of the requested null spaces for the UE comprises one or more null space weights for at least one antenna phase shifter of the UE.

13. The method of claim 10, further comprising:
conducting a beam management refinement procedure in response to a changed condition of the UE, wherein the null space report is triggered by the beam management refinement procedure.

14. The method of claim 10, wherein the null space report is triggered based on a change of phase shifter weights for the UE.

15. The method of claim 14, wherein the change of the phase shifter weights for the UE occur due to one or more of an expected future interference from the base station or another base station, a change in a channel, a change of a location of the UE in comparison to the base station, or a handover to a different base station.

16. The method of claim 10, wherein the null space report comprises an interferer angle of arrival report indicating a location of one or more interferers and a corresponding null space of the UE to mitigate interference from the one or more interferers.

17. An apparatus for wireless communication at a user equipment (UE), comprising:
a memory; and
at least one processor coupled to the memory and configured to:
establish a connection with a base station;
transmit, to the base station, a UE report comprising one or more beamforming capabilities of the UE; and
receive, from the base station, a null space report comprising null space information for the UE based on the one or more beamforming capabilities reported by the UE.

18. A method of wireless communication at a base station, comprising:
receiving, from a user equipment (UE), a request to establish a connection;
receiving, from the UE, a UE report comprising one or more beamforming capabilities of the UE; and
transmitting, to the UE, a null space report comprising null space information for the UE based on beamforming capabilities reported by the UE.

19. The method of claim 18, wherein the beamforming capabilities of the UE comprise an active number of antennas at the UE.

20. The method of claim 18, wherein the beamforming capabilities of the UE comprise an antenna array structure, wherein the antenna array structure comprises at least one of a linear array, a rectangular array, or a circular array.

21. The method of claim 18, wherein the beamforming capabilities of the UE comprise a distance between adjacent antennas.

22. The method of claim 18, wherein the beamforming capabilities of the UE comprise an average antenna main beamwidth, a maximum antenna beamwidth, or a minimum antenna beamwidth.

23. The method of claim 18, wherein the beamforming capabilities of the UE comprise phase shifter capabilities, wherein the phase shifter capabilities include a number of supported bits per angle and amplitude or a vector of phase shifting supported values.

24. The method of claim 18, wherein the beamforming capabilities of the UE comprise an angle of arrival of a downlink signal from the base station.

25. The method of claim 24, wherein the angle of arrival for the downlink signal is determined based on a channel state information reference signal (CSI-RS) or a demodulation reference signal (DMRS).

26. The method of claim 18, further comprising:
determining a changed condition of the beamforming capabilities of the UE, wherein the null space report comprises parameters for a set of requested null spaces for the UE.

27. The method of claim 26, wherein the parameters for each requested null space in the set of requested null spaces for the UE comprises an angle for a corresponding null space.

28. The method of claim 26, wherein the parameters for each requested null space in the set of requested null spaces for the UE comprises one or more null space weights for at least one antenna phase shifter of the UE.

29. The method of claim 26, wherein the null space report comprises an interferer angle of arrival report indicating a location of one or more interferers and a corresponding null space of the UE to mitigate interference from the one or more interferers.

30. An apparatus for wireless communication, comprising:
a memory; and
at least one processor coupled to the memory and configured to:

receive, from a user equipment (UE), a request to establish a connection;
receive, from the UE, a UE report comprising one or more beamforming capabilities of the UE; and
transmit, to the UE, a null space report comprising null space information for the UE based on beamforming capabilities reported by the UE.

* * * * *